3,013,940
ORGANO - MERCAPTO - METHYLENEAMIDES OF O,O-DIALKYL-THIO(OR DITHIO)-PHOSPHORYL-ACETIC ACIDS HAVING PESTICIDAL ACTIVITY
Raffaello Fusco, Giuseppe Losco, and Giorgio Rossi, Milan, Italy, assignors to Montecatini Societa Generale per l'Industria Mineraria e Chimica, a corporation of Italy
No Drawing. Filed May 27, 1958, Ser. No. 738,022
Claims priority, application Italy June 3, 1957
16 Claims. (Cl. 167—22)

The present invention relates to the preparation and the use of organo-mercapto-methylenamides of O,O-dialkyl-thio- and dithiophosphorylacetic acids corresponding to the general formula:

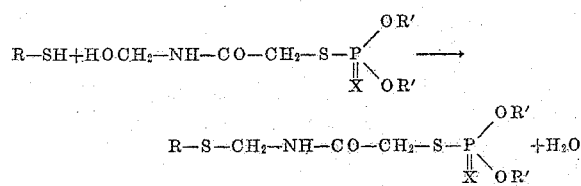

where R is preferably a normal or branched saturated or unsaturated alkyl or alkenyl or a cycloaliphatic or aryl radical, substituted and unsubstituted; R' is a lower alkyl radical, i.e. having up to nine carbon atoms; and X is oxygen or sulfur.

The products of the present invention are low melting point crystalline substances or liquids which are soluble in most organic solvents, and are generally water-insoluble. The products have a wide range or spectrum of pesticide activity, and are usefully applied alone, or in admixture with the common pesticides, such as insecticides or fungicides, and also in admixture with fertilizers.

They are prepared by reaction of mercaptans and N-methylol-amides of O,O-dialkyl-thio- or dithiophosphoryl-acetic acids according to the following scheme:

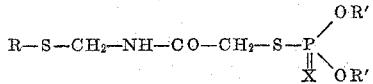

R, R' and X being defined as above.

Said reaction is carried out in the presence of an acid condensation agent, such as, for example, $H_2SO_4$, HCl, $ZnCl_2$, $CaCl_2$, etc., and with partial or complete solution or suspension of both reactants in a liquid solvent or dispersing agent. The liquid is preferably inert to one or both reactants. The reaction is carried out at temperatures generally between 20° C. and 100° C., at ordinary or atmospheric pressure, or under slight autogenetic pressure, particularly when operating with mercaptans of low boiling point. Ketones, esters, ethers, hydrocarbons, and mixtures thereof can be used as said liquid. The reaction product is then separated, for example by addition of water if the solvent used is miscible with water, or, preferably, by evaporation of the solvent after elimination of the acid catalyst.

An alternative to the process for obtaining the compounds of the present invention consists of reacting alkyl- or aryl-mercapto-methylenamide of alpha-halo-acetic acid with alkaline salts of O,O-dialkyl-thio- or dithiophosphoric acids according to the following scheme:

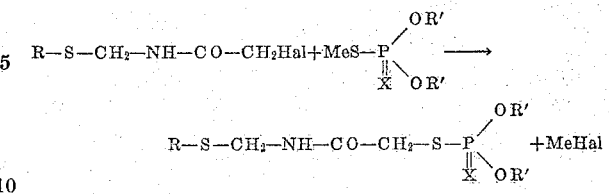

where R, R' and X have the above-mentioned meaning, Hal is a halogen and Me is an alkali or alkaline earth metal or radical.

Said reaction is carried out in a total or partial solution or suspension of both reactants, using as solvent, or as dispersing agent, a liquid preferably inert to one or both reactants, e.g. ketones, ester, alcohols, etc. or mixtures thereof, at room temperature for a sufficient time, or at the reflux temperature of the solvent, until the metal halide is completely precipitated.

The reaction product is then separated by drowning it in water, or by solvent evaporation, under suction for example, after removal of the inorganic salt by filtration.

The following examples illustrate the present invention however without limiting its scope.

EXAMPLE 1

54 g. N-oxymethylamide of O,O-diethyl-dithiophosphorylacetic acid (melting point 71–72° C.), of the formula

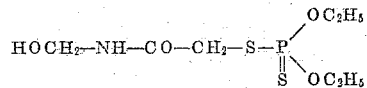

are added to a solution of 14 g. methylmercaptan in 100 cc. ethyl acetate. 8 cc. benzene saturated with gaseous HCl are also added and the vessel is heated at 45° C. for 6 hours while stirring and then left at room temperature for 15 hours.

The liquid obtained is washed with 30 cc. of a cold saturated $NaHCO_3$ solution and then with 50 cc. water. It is dried on $Na_2SO_4$ and evaporated under vacuum. The residual product, consisting of methyl-mercapto-methylenamide of O,O - diethyl - dithiophosphorylacetic acid, is a white crystalline solid weighing 51 g. A sample, crystallized from an ethyl ether-petroleum ether mixture, has a melting point of 49–49.5° C.

EXAMPLE 2

6 g. methyl-mercapto-methylenamide of monochloroacetic acid (melting point 55–56° C.), of the formula

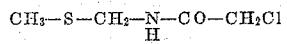

and 10.0 g. potassium O,O-diethyl-dithiophosphate are allowed to react in 100 cc. acetone at room temperature for 15 hours.

The mixture is drowned in 200 cc. water and the precipitate is filtered and washed with water.

8.3 g. methyl-mercapto-methylenamide of O,O-diethyl-dithiophosphorylacetic acid, with a melting point of 49° C., identical with the product of Example 1, are thus obtained.

EXAMPLE 3

38.2 g. methyl-mercapto-methylenamide of monochloroacetic acid, 52.0 g. potassium O,O-diethyl-thiophosphate and 150 cc. acetone are mixed and stirred at room temperature for 24 hours. The mixture is then refluxed for 1 hour. The potassium chloride thus formed is separated by filtration and the filtrate is heated under suction to eliminate the solvent.

The residual product (71 g.) consisting of methyl-mercapto-methylenamide of O,O-diethyl-thio-phosphorylacetic acid is a clear oil, with a slight straw-yellow color and an index of refraction $n_D^{20} = 1.5079$.

EXAMPLE 4

49 g. N-oxymethylamide of O,O-dimethyl-dithiophosphorylacetic acid (melting point 82–83° C.) are added to a solution of 12 g. methyl-mercaptan in 80 cc. benzene. 6 cc. benzene, previously cold saturated with gaseous HCl are added and the closed container is heated to 45–50° C. for 6 hours while frequently stirring, and is then left at room temperature for 15 hours. The benzene solution of the reaction product, which is turbid because of the presence of water, is washed with a diluted $NaHCO_3$ solution until it is neutral, and then dried on $Na_2SO_4$ and evaporated under vacuum.

The residue consists of 51.5 g. methyl-mercapto-methylenamide of O,O-dimethyl-dithiophosphoryl-acetic acid, which can be purified by crystallization from an ethyl ether-petroleum ether mixture and has a melting point of 39–40° C.

EXAMPLE 5

54.5 g. N-oxymethylamide of O,O-diethyl-dithiophosphorylacetic acid, 13.7 g. ethyl mercaptan and 100 cc. ethyl acetate are placed in a vessel. 8 cc. benzene saturated with HCl are added, and the mixture heated to 45° C. for 6 hours and left at room temperature for 15 hours.

The desired product, that is, the ethyl-mercapto-methylenamide of O,O-diethyl-dithiophosphorylacetic acid is obtained, after the usual treatment, in the form of a slightly opalescent oil, weighing 54.2 g. This product, after purification by crystallization from an ether-petroleum ether mixture, appears in the form of colorless crystals having a melting point of 28.5–29.5° C.

EXAMPLE 6

49 g. N-oxymethylamide of O,O-dimethyl-dithiophosphorylacetic acid, 13.7 g. ethyl mercaptan and 100 cc. ethyl acetate, treated as described in the preceding example, yield 52.5 g. ethyl-mercapto-methylenamide of O,O-dimethyl-dithiophosphorylacetic acid with a melting point of 41–42° C. (after crystallization from ethyl ether-petroleum ether).

EXAMPLE 7

54.5 g. N-oxymethylamide of O,O-diethyl-dithiophosphorylacetic acid, 16.8 g. isopropyl mercaptan and 120 cc. ethyl acetate are heated to 48° C. for 6 hours in the presence of traces of anhydrous HCl. After 15 hours a washing with an aqueous alkaline solution is carried out, and the solvent is eliminated under suction. 60 g. isopropyl-mercapto-methylenamide of O,O-diethyl-dithiophosphorylacetic acid are obtained, as a colorless solid. It is crystallized from 80% methyl alcohol and melts at 42–43° C.

EXAMPLE 8

18.1 g. isopropyl-mercapto-methylenamide of chloroacetic acid (M.P. 68–70° C.), 20.8 g. potassium O,O-diethyl-thiophosphate and 80 cc. acetone are allowed to react at a temperature not thigher than 30° C. for 24 hours. The reaction mixture is then kept for 1 hour at the refluxing temperature of the solvent. After filtration of the potassium chloride and elimination of the solvent, 32 g. isopropyl-mercapto-methylenamide of O,O-diethyl-thiophosphorylacetic acid are obtained in the form of a clear oil, slightly yellow colored, having a refraction index of $n_D^{20} = 1.4978$.

EXAMPLE 9

49 g. N-oxymethylenamide of O,O-dimethyl-dithiophosphorylacetic acid, 16.8 g. isopropyl mercaptan and 120 cc. ethyl acetate, added with 10 cc. benzene saturated with HCl, are stirred at 45° C. for 3 hours and then left at room temperature for 30 hours. The mixture is stirred first with 25 cc. of a diluted aqueous $NaHCO_3$ solution, then with 50 cc. $H_2O$. After drying on $MgSO_4$, it is evaporated under vacuum.

The residual product consists of isopropyl-mercapto-methylenamide of O,O-dimethyl-dithiophosphorylacetic acid. It is a white, colorless solid, crystallizable from diluted methyl alcohol, having a melting point of 59.5–60.5° C.

EXAMPLE 10

27.3 g. N-oxymethylamide of O,O-diethyl-dithiophosphorylacetic acid are mixed with 11 g. thiophenol. 4 drops conc. hydrochloric acid are added and the mass is heated to 45° C. while stirring until it becomes homogeneous. It is then left to stand for 20 hours. The solid mass thus obtained is broken, washed with $NaHCO_3$ solution and filtered. 31 g. phenyl-mercapto-methylenamide of O,O-diethyl-dithiophosphorylacetic acid, melting point 60–61° C. (from methyl alcohol), are obtained.

The products comprised in the afore-mentioned general formula have shown interesting insecticidal properties which make them useful for practical application in antiparasitic control. This was substantiated as follows:

*Methods for evaluating the biological activity of the pesticidal compounds of the present invention*

(1) *Aphicidal activity.*—Young broad bean plants, infested by aphids (*Aphis fabae* Scop.) are dipped for a few seconds in suitably formulated aqueous dispersions of the product to be examined, and then kept and checked under determined conditions of lightning, temperature and moisture suitable for the insects. 24 hours after the treatment the insect mortality with the various doses of the product is observed under a binocular microscope.

(2) *Acaricide activity.*—The test is carried out as in determining the aphicidal activity, using the red spider (*Tetranychus telarius* L.) grown on young bean plants.

(3) *Ovicidal activity.*—Grown female red spiders (*T. telarius* L.) are placed for 24 hours on young bean plants, having only cotyledon leaves, for the egg deposition. The grown insects are then eliminated with a jet of compressed air and the plants are treated as in method 1. The egg mortality is controlled after 6 days under the binocular microscope.

(4) *Systemic activity by root absorption.*—The hypogeous portion of young broad bean plants infested by aphids (*Aphis fabae* Scop.) is introduced into small colored glass vases containing aqueous dispersions of the test products. The small vases are kept in a room suitable for the insects for 8 days, while observing daily the mortality of the aphids living on the hypogeous portion of the plants.

(5) *Insecticidal activity on flies by topical application.*—By means of a microsyringe "Agla" one drop (1 mm.$^3$) of acetone solution of the test product is applied to the dorsal region of 4 days aged female domestic flies (*Muscal domestica* L.) (a strain grown in the laboratory, sensitive to the organic chlorinated products and to other insecticides). The insects are kept under observation in suitable small metallic cages and the mortality control is carried out after 24 hours.

(6) *Insecticidal activity on flies by tharsal absorption.*—Female domestic flies (*Musca domestica* L.) like those used in the preceding method, are introduced into 1000 cc. glass beakers whose inner surface has been coated with a uniform film of the product to be examined. These beakers, closed with a gauze, are kept in a room under suitable temperature and moisture conditions, the knockdown of the insects in the first 2 hours and the mortality after 20 hours being determined.

We report below the data relating to some of the examples mentioned in this patent application. The values are expressed as LD 50 in mg./kg. of weight of the treated animals (LD 50 being the dosis causing a 50% mortality of the treated animals).

TABLE I. RESULTS OF THE EVALUATION OF THE BIOLOGICAL ACTIVITY

| | Active substance conc., percent | Aphids, mortality | Acari, mortality | Ovicidal | | Systemic | |
|---|---|---|---|---|---|---|---|
| | | | | a.s. conc. | mortality | p.p.m. | mortality |
| Ex. 1—Methylmercaptomethylenamide of O,O-diethyldithiophosphorylacetic acid. | 0.2 | 100 | 100 | 0.2 | 100 | 250 | 100 |
| | 0.04 | 100 | 100 | 0.1 | 100 | 25 | 100 |
| | 0.008 | 100 | 100 | 0.05 | 96 | 2.5 | 100 |
| Ex. 3—Methylmercaptomethylenamide of O,O-diethylthiophosphorylacetic acid. | 0.2 | 100 | 100 | 0.2 | 82 | 250 | 100 |
| | 0.04 | 100 | 100 | 0.1 | 45 | 25 | 100 |
| | 0.008 | 100 | 100 | 0.05 | 10 | 2.5 | 100 |
| Ex. 4—Methylmercaptomethylenamide of O,O-dimethyldithiophosphorylacetic acid. | 0.2 | 100 | 100 | 0.2 | 65 | 250 | 100 |
| | 0.04 | 100 | 100 | 0.1 | 0 | 25 | 65 |
| | 0.008 | 100 | 100 | 0.05 | 0 | 2.5 | 0 |
| Ex. 5—Ethylmercaptomethylenamide of O,O-diethyldithiophosphorylacetic acid. | 0.2 | 100 | 100 | 0.2 | 100 | 250 | 100 |
| | 0.04 | 100 | 100 | 0.1 | 91 | 25 | 98 |
| | 0.008 | 100 | 98 | 0.05 | 60 | 2.5 | 5 |
| Ex. 6—Ethylmercaptomethylenamide of O,O-dimethyldithiophosphorylacetic acid. | 0.2 | 100 | 100 | 0.2 | 82 | 250 | 100 |
| | 0.04 | 100 | 100 | 0.1 | 20 | 25 | 90 |
| | 0.008 | 100 | 98 | 0.05 | 0 | 2.5 | 0 |
| Ex. 7—Isopropylmercaptomethylenamide of O,O-diethylthiophosphorylacetic acid. | 0.2 | 100 | 100 | 0.2 | 100 | 250 | 92 |
| | 0.04 | 100 | 100 | 0.1 | 100 | 25 | 15 |
| | 0.008 | 100 | 97 | 0.05 | 100 | 2.5 | 0 |
| Ex. 8—Isopropylmercaptomethylenamide of O,O-diethylthiophosphorylacetic acid. | 0.2 | 100 | 100 | 0.2 | 91 | 250 | 100 |
| | 0.04 | 100 | 95 | 0.1 | 66 | 25 | 100 |
| | 0.008 | 99 | 30 | 0.05 | 11 | 2.5 | 0 |
| Ex. 9—Isopropylmercaptomethylenamide of O,O-dimethyldithiophosphorylacetic acid. | 0.2 | 100 | 100 | 0.2 | 98 | 250 | 100 |
| | 0.04 | 99 | 100 | 0.1 | 75 | 25 | 100 |
| | 0.008 | 29 | 78 | 0.05 | 58 | 2.5 | 10 |

TABLE II

| | Topical appl., γ per fly | | | Beaker, g./m.³ | | |
|---|---|---|---|---|---|---|
| | 10 | 2 | 0.4 | 0.125 | 0.025 | 0.005 |
| Ex. 1—Methylmercaptomethylenamide of O,O-diethyldithiophosphorylacetic acid, percent mortality | 100 | 99 | 5 | 100 | 94 | 4 |
| Ex. 4—Methylmercaptomethylenamide of O,O-dimethyldithiophosphorylacetic acid, percent mort | 100 | 100 | 16 | 100 | 79 | 5 |
| Ex. 3—Methylmercaptomethylenamide of O,O-diethylthiophosphorylacetic acid, percent mortality | 100 | 77 | 3 | 100 | 83 | 55 |
| Ex. 5—Ethylmercaptomethylenamide of O,O-diethyldithiophosphorylacetic acid, percent mortality | 100 | 96 | 1 | 100 | 90 | 1 |
| Ex. 6—Ethylmercaptomethylenamide of O,O-dimethyldithiophosphorylacetic acid, percent mortality | 100 | 92 | 0 | 100 | 67 | 1 |
| Ex. 7—Isopropylmercaptomethylenamide of O,O-diethylthiophosphorylacetic acid, percent mortality | 100 | 72 | 0 | 100 | 60 | 1 |
| Ex. 8—Isopropylmercaptomethylenamide of O,O-diethylthiophosphorylacetic acid, percent mortality | 99 | 11 | 0 | 100 | 73 | 17 |
| Ex. 9—Isopropylmercaptomethylenamide of O,O-dimethyldithiophosphorylacetic acid, percent mortality | 100 | 76 | 1 | 100 | 61 | 4 |

*Determination of the acute toxicity by oral or intravenous application (on warm-blooded animals) of mercapto-methylenamides of O,O-dialkyl-thio- and dithio-phosphorylacetic acids*

A determination has been made of the acute toxicity, per oral or intravenous administration, of the compounds of the present patent application on warm-blooded animals. The determination of the acute toxicity per os was carried out by gastric sounding and the administration of a dimethyl-acetamide solution of the test products on small white rats weighing 18–20 g. The interference of the solvent in the toxic manifestations can be considered as negligible.

The determination of the acute toxicity by intravenous application was carried out with the said products dissolved in demethylacetamide, on small white rats weighing 18–20 g.

TABLE III

| | Toxicity by— | |
|---|---|---|
| | endovenous application | oral application |
| Parathion | 5.7 | 8.2 |
| Ex. 1—Methylmercaptomethylenamide of O,-O-diethyl-diethiophosphorylacetic acid | 60 | 54.5 |
| Ex. 3—Methylmercaptomethylenamide of acid O,O-diethylphosphorylacetic acid | 9.6 | 11.5 |
| Ex. 4—Methylmercaptomethylenamide of O,-O-dimethyldithiophosphorylacetic acid | 155 | 550 |
| Ex. 5—Ethylmercaptomethylenamide of O,-O-diethyldithiophosphorylacetic acid | 55 | 32.5 |
| Ex. 6—Ethylmercaptomethylenamide of O,-O-dimethyldithiophosphorylacetic acid | 130 | 225 |
| Ex. 7—Isopropylmercaptomethylenamide of O,O-diethyldithiophosphorylacetic acid | 58 | 64 |

In Table I, the abbreviation "a.s." means "active substance."

In Table II, the symbol "γ" means a millionth of a gram, and "Beaker g./m.²" means, in reference to the antecedent paragraph designated (6), that the tests are carried out by introducing the flies into a beaker (cylindrical glass surface) whose inner walls have been sprayed with a solution of the active substance, to obtain a film containing a given number of grams per square meter of said surface.

The term "LD 50" means lethal dose by which a 50% mortality is obtained.

We claim:

1. A process of preparing a mercapto-methylenamide of an O,O-dialkyl-thio-phosphorylacetic acid, characterized in that a mercaptan is reacted with an N-methylolamide of an O,O-dialkyl-thio-phosphorylacetic acid, the reactants and the reaction being according to the following reaction scheme:

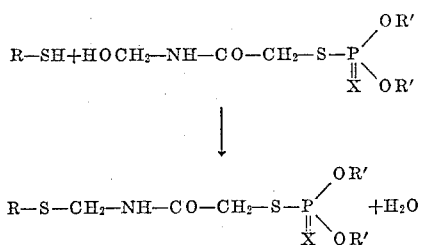

where X is taken from the group consisting of oxygen and sulfur, R is taken from the group consisting of lower alkyl and phenyl radicals, and R' is a lower alkyl radical, the reaction being carried out in a liquid organic diluent that is inert in the reaction, and at a temperature between about 20° C. and 100° C.

2. A process of preparing a mercapto-methylenamide of an O,O-dialkyl-thio-phosphorylacetic acid, characterized in that a mercaptan is reacted with an N-methylolamide of an O,O-dialkyl-thio-phosphorylacetic acid, the reactants and the reaction being according to the following reaction scheme:

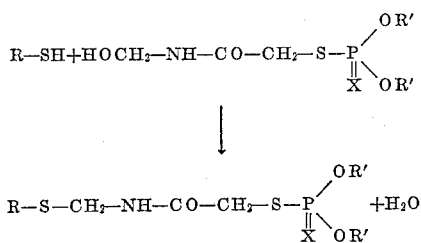

where X is taken from the group consisting of oxygen and sulfur, R is taken from the group consisting of lower alkyl and phenyl radicals, and R' is a lower alkyl raical, the reaction being carried out in an inert organic diluent in the presence of an acid.

3. The process of claim 2, carried out at a temperature between 0° and 150° C.

4. A process for preparing a mercapto-methylenamide of an O,O-dialkyl-thio-phosphorylacetic acid, characterized in that a mercaptomethylen-alpha-halo-acetamide is reacted with a salt of an O,O-dialkyl-thio-phosphoric acid, the reactants and the reaction being according to the following reaction scheme:

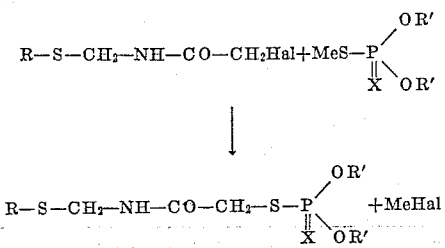

where X is taken from the group consisting of oxygen and sulfur, R is taken from the group consisting of lower alkyl and phenyl radicals, and R' is a lower alkyl radical, the reaction being carried out in an organic solvent for at least one of the reactants, and at a temperature between 0° and 150° C.

5. The process of claim 4, carried out in an organic solvent for at least one of the reactants, at a temperature between not higher than about 50° C.

6. As an antiparasiticide, a compound taken from the group consisting of

Methylmercapto-methylenamide of O,O-dimethyl-dithiophosphorylacetic acid
Methylmercapto-methylenamide of O,O-diethyl-dithiophosphorylacetic acid
Methylmercapto-methylenamide of O,O-diethyl-thiophosphorylacetic acid
Ethylmercapto-methylenamide of O,O-dimethyl-dithiophosphorylacetic acid
Ethylmercapto-methylenamide of O,O-diethyl-dithiophosphorylacetic acid
Isopropylmercapto-methylenamide of O,O-dimethyl-dithio-phosphorylacetic acid
Isopropylmercapto-methylenamide of O,O-diethyl-dithio-phosphorylacetic acid
Isopropylmercapto-methylenamide of O,O-diethyl-thio-phosphorylacetic acid, and
Phenylmercapto-methylenamide of O,O-diethyl-dithio-phosphorylacetic acid 7. As an antiparasiticide, methylmercapto-methylenamide of O,O-dimethyl-dithiophosphorylacetic acid.

8. As an antiparasiticide, methylmercapto-methylenamide of O,O-diethyl-dithiophosphorylacetic acid.

9. As an antiparasiticide, methylmercapto-methylenamide of O,O-diethyl-thiophosphorylacetic acid.

10. As an antiparasiticide, ethylmercapto-methylenamide of O,O-dimethyl-dithiophosphorylacetic acid.

11. As an antiparasiticide, ethylmercapto-methylenamide of O,O-diethyl-dithiophosphorylacetic acid.

12. As a pest control agent, a compound of the formula

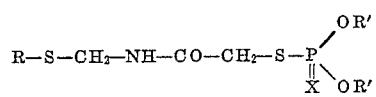

where X is taken from the group consisting of oxygen and sulfur, R is taken from the group consisting of lower alkyl and phenyl radicals, and R' is a lower alkyl radical.

13. A process of preparing a mercapto-methylenamide of an O,O-dialkyl-thio-phosphorylacetic acid, characterized in that a mercaptan is reacted with an N-methylolamide of an O,O-dialkyl-thio-phosphorylacetic acid, the reactants and the reaction being according to the following reaction scheme:

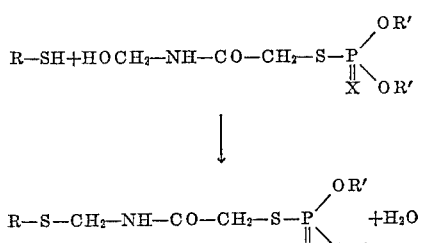

where X is taken from the group consisting of oxygen and sulfur, R is taken from the group consisting of lower alkyl and phenyl, and R' is a lower alkyl radical, the reaction being carried out in a liquid organic diluent, and at a temperature between about 20° C. and 100° C., said diluent being taken from the group consisting of ethyl acetate, acetone, and benzene.

14. In the art of controlling insect pests, the improvement comprising applying to the locality of the pest, in a concentration toxic to the pest, a compound of the formula:

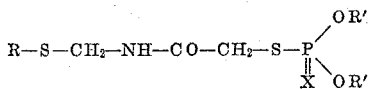

where X is taken from the group consisting of oxygen and sulfur, R is taken from the group consisting of lower alkyl and phenyl radicals, and R' is a lower alkyl radical.

15. In the art of controlling insect pests, the improvement comprising applying to the locality of the pest, in a concentration toxic to the pest, a compound taken from the group consisting of Methylmercapto-methylenamide of O,O-dimethyl-dithiophosphorylacetic acid
Methylmercapto-methylenamide of O,O-diethyl-dithiophosphorylacetic acid
Methylmercapto-methylenamide of O,O-diethyl-thiophosphorylacetic acid
Ethylmercapto-methylenamide of O,O-dimethyl-dithiophosphorylacetic acid
Ethylmercapto-methylenamide of O,O-diethyl-dithiophosphorylacetic acid
Isopropylmercapto-methylenamide of O,O-dimethyl-dithiophosphorylacetic acid
Isopropylmercapto-methylenamide of O,O-diethyl-dithiophosphorylacetic acid
Isopropylmercapto-methylenamide of O,O-diethyl-thiophosphorylacetic acid, and
Phenylmercapto-methylenamide of O,O-diethyl-dithiophosphorylacetic acid 16. The process defined in claim 15, the insect pest being taken from the class consisting of aphids, acari, flies, and their ova.

References Cited in the file of this patent
UNITED STATES PATENTS

| | | |
|---|---|---|
| 2,494,283 | Cassaday et al. | Jan. 10, 1950 |
| 2,571,989 | Schrader | Oct. 16, 1951 |
| 2,816,146 | Doumani | Dec. 10, 1957 |
| 2,829,171 | Doumani | Apr. 1, 1958 |

FOREIGN PATENTS

| | | |
|---|---|---|
| F. 18,068 | Germany | July 5, 1956 |
| 1,022,579 | Germany | Jan. 16, 1958 |
| 791,824 | Great Britain | Mar. 12, 1958 |

OTHER REFERENCES

Schoberl et al.: "Methoden der Organischen Chemie," Band IX, p. 117 (1955).

De Pietri-Tonelli: "Chem, Abst.," vol. 50, No. 21, Col. 16, 021 (1956).